July 1, 1930.  G. L. DEJEAN  1,769,773
FEEDING MECHANISM FOR BORING BARS
Filed Feb. 27, 1928
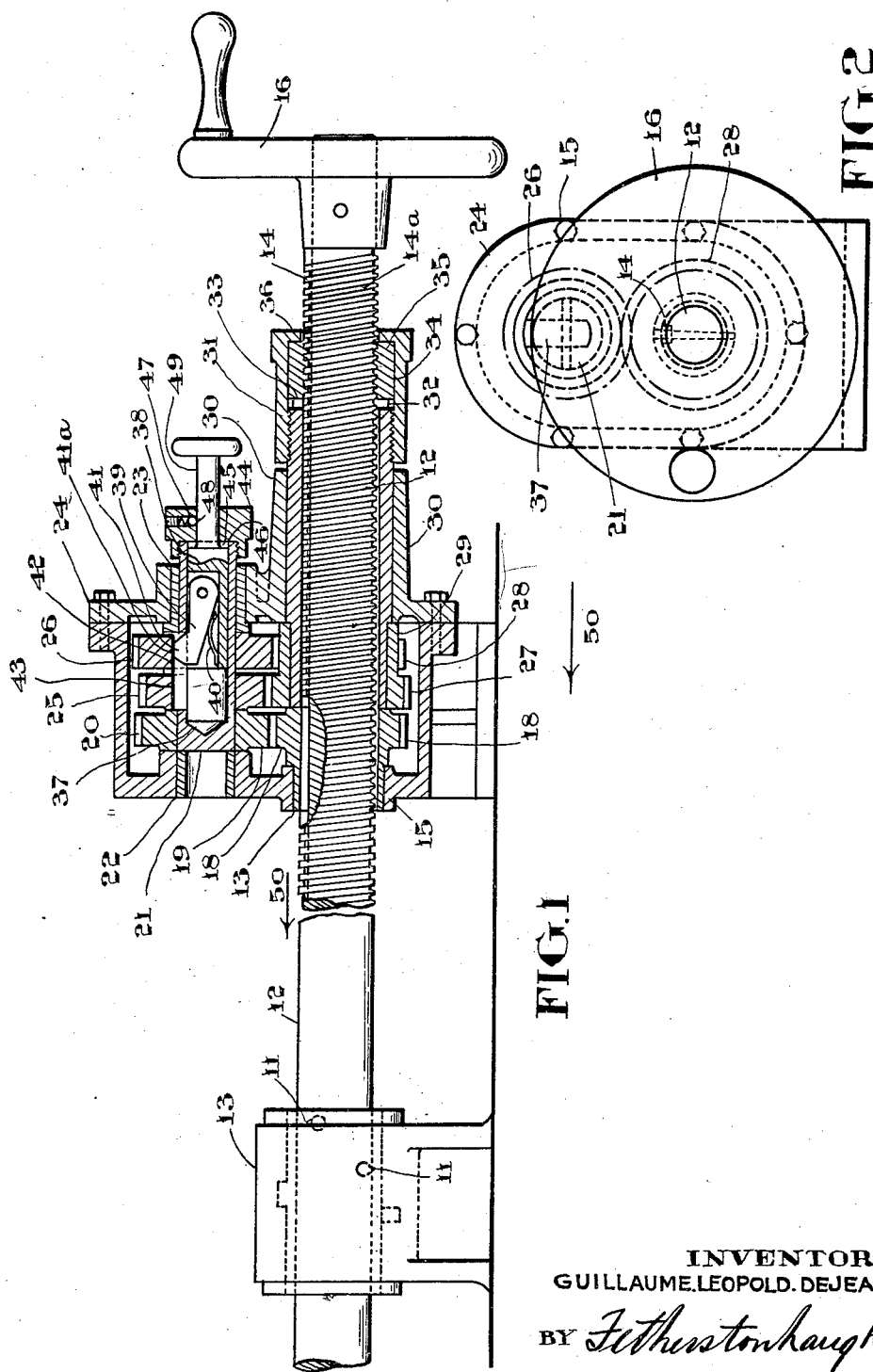

Patented July 1, 1930

1,769,773

UNITED STATES PATENT OFFICE

GUILLAUME LEOPOLD DEJEAN, OF MONTREAL, QUEBEC, CANADA

FEEDING MECHANISM FOR BORING BARS

Application filed February 27, 1928. Serial No. 257,358.

This invention relates to new and useful improvements in feeding mechanism for machine tools, and the object of the invention is to provide a slow tool feeding mechanism which will produce a finished surface on the work under operation without leaving tool marks which usually have to be removed by hand scraping or such like expensive operation.

According to my invention I attain the above object by providing a differential screw feed mechanism which is adapted to feed the tool at a very slow speed through the work, so that machine tool marks are practically eliminated. The tool is moved to or from the work without altering the direction of rotation of the tool holding screw or spindle.

In the more specific embodiment of my invention the cutting tool or tools are secured to a bar or spindle threaded at one end and rotatably mounted in suitable bearings. The bar passes through a nut which may be rotated on, but is prevented from movement in the longitudinal direction of the screw. The screw is rotated by any suitable means and drives the nut in the same direction through suitable trains of gears. The difference in speeds between the bar and the nut regulates the speed of travel of the tool.

In the drawing which illustrates one embodiment of my invention:—

Figure 1 is a part sectional side elevation of my improved tool feeding mechanism.

Figure 2 is an end elevation of the mechanism shown in Figure 1.

Referring more particularly to the drawings, 11 designates the tools which are held in place on the tool carrying spindle or bar 12, by any suitable means. The bar is supported in the bearings 13. One end 14ª of the bar is threaded and this end is slotted to form a keyway 14 for the purpose hereinafter described. The threaded end is rotatably mounted in a gear box 15 and the bar is rotated by the handle 16.

Rotating with the bar and secured thereto by a sliding key, is the pinion 18. The teeth of the pinion engage with the teeth 19 of the wheel 20 secured to or made integral with the shaft 21, mounted in bearings 22 and 23 formed in the gear box and cover 24 therefor. Rotatably mounted on the shaft 21 are the toothed wheels 25 and 26, which engage with toothed wheels 27 and 28 secured to and adapted to rotate with a sleeve 29 rotatably mounted on the threads of the spindle 12. The sleeve is rotatably mounted in bearings 30 formed in the cover 24. One end 31 of the sleeve is provided with projections 32 which engage with projections 33 formed in the end 34 of a threaded nut 35. This nut engages with the threads of the spindle. The nut is held in place by means of a cap 36 which is secured to the end of the sleeve. The projections on the sleeve and the nut are small circumferentially, so that there is a predetermined free circumferential movement between the nut and the sleeve. The shaft 21 is provided with a recess 37 to receive a sliding pin 38 which moves a latch 39. The latch is operated by means of a spring 40, which forces the latch projection 41 through the slot 41ª into engagement with one of the keyways 42 and 43 formed in the wheels 25 and 26 respectively. The latch is pivotally mounted within the pin 38. The end of the shaft 21 has secured thereto a cap 44, which engages with the shoulder 45 to limit the outward movement of the pin 38 by engaging with the shoulder 46. A spring controlled ball catch 47 is mounted in the cap and engages with recesses 48 in the reduced shank 49 of the pin 38 to hold the latch in engagement with the pinions. The recess in the shaft is deep enough to allow the latch, when the pin is pressed inwardly, to engage with the inner wall of the recess to hold the latch in the neutral position, that is out of engagement with the wheels 25 and 26. The wheel 25 is made smaller than the wheel 20, while the wheel 26 is made larger than the wheel 20. The toothed wheel 27 is made larger than the pinion 18, while the wheel 28 is made smaller than said pinion for the purpose hereinafter described.

In operation the tool carrying bar is rotated in one direction. The pinion on said bar rotates the shaft 21 and, if the latch is in the position shown in Figure 1, the pinion 26 is rotated and drives the sleeve in the same direction but at a higher circumferential speed than the bar. The sleeve rotates the nut engaging with the threads of the bar. The nut is prevented from longitudinal movement and it will be seen that the longitudinal movement of the spindle is in the direction indicated by arrow 50, if the thread is right hand. To reverse the movement of the bar, the latch is moved into engagement with the wheel 26 which rotates the sleeve at a slower rate of speed than that of the bar, so that the movement of the bar is in the reverse direction to that indicated by the arrow 50. The ball catch positions the latch by holding the sliding pin against movement in the recess in the shaft 21, during the cutting operation. The projections allow a predetermined free circumferential movement between the sleeve and the nut to facilitate the changing of the latch. The corners 51 of the latch are rounded to assist in bringing the latch into keyway engaging position. When the latch is in the neutral position, the bar may be rapidly moved in its longitudinal direction by holding the nut on the spindle.

It will be seen that the feed mechanism is slow and the travel of the tool per revolution of the bar small, so that a much finer cutting speed is obtained than can be obtained by any of the tool feeding mechanisms now commonly in use. The device is particularly adapted for boring out automobile crank shaft bearings and the like, in such a manner that a very smooth bore is obtained, and scraping of the bearings eliminated when fitting the shaft in place. The device is simple in operation and the feed mechanism is controlled to move the tool towards or away from the work under operation, without altering the direction of rotation of the spindle.

Having thus described my invention, what I claim is:—

1. In tool feeding mechanism, a casing, a threaded tool holding bar rotatably and slidably mounted therein, a toothed wheel driven by the bar and slidably mounted therein, a shaft in said casing having a wheel secured thereto and engaging with the wheel on the bar, a pair of gears rotatably mounted on the shaft and meshing with toothed wheels on a sleeve rotatably mounted on the bar, a threaded nut on said bar and driven by said sleeve, a latch slidably mounted in the shaft and adapted to be brought into driving engagement with one of the wheels thereon, and means to position the latch.

2. A tool feeding mechanism according to claim 1 having the sleeve and the nut connections adapted to allow a free predetermined rotary movement between them to facilitate changing the position of the latch.

In witness whereof, I have hereunto set my hand.

GUILLAUME LEOPOLD DEJEAN.